United States Patent [19]
Zier et al.

[11] 3,901,380
[45] Aug. 26, 1975

[54] VIBRATING CONVEYOR DRIVE

[75] Inventors: George F. Zier, Portland; Candido Casciato, Newberg; Franklin G. Smith, Portland, all of Oreg.

[73] Assignee: Vi-Con, Inc., Portland, Oreg.

[22] Filed: June 25, 1973

[21] Appl. No.: 373,170

[52] U.S. Cl. .......................................... 198/220 DA
[51] Int. Cl. .............................................. B65g 27/00
[58] Field of Search ................ 198/220 CD, 220 CB, 220 DA

[56] References Cited
UNITED STATES PATENTS

| | | | |
|---|---|---|---|
| 2,684,754 | 7/1954 | Bankauf et al. | 198/220 CB |
| 2,899,044 | 8/1959 | Allen et al. | 198/220 DB |
| 2,951,581 | 9/1960 | Long et al. | 198/220 CB |
| 3,012,654 | 12/1961 | Allen et al. | 198/220 OA |

FOREIGN PATENTS OR APPLICATIONS 833,564   3/1952   Germany ..................... 198/220 DB

*Primary Examiner*—Stanley H. Tollberg
*Assistant Examiner*—Hadd Lane
*Attorney, Agent, or Firm*—Klarquist, Sparkman, Campbell, Leigh, Hall & Whinston

[57] ABSTRACT

A conveyor table is reciprocated by a pair of connecting rods driven by a crankshaft journaled in bearings mounted in hanger plates extending downwardly from a top frame connected to a base frame by leaf spring struts. A rotor is keyed to the crankshaft and is concentric to the bearings. An electric motor drives belts entrained around the rotor to rotate the rotor and the crankshaft. The motor has a brake to rapidly stop the drive of the crankshaft when the motor is deenergized.

6 Claims, 3 Drawing Figures

VIBRATING CONVEYOR DRIVE

DESCRIPTION

This invention relates to a vibrating conveyor drive and has for an object thereof the provision of a simplified drive for a vibrating conveyor.

Another object of the invention is to provide a very effective vibrating conveyor drive with a minimum of vibration transmitted to a supporting base.

A further object of the invention is to journal a rotary drive below a top supporting frame resiliently mounted on a fixed base frame below the rotary drive.

Another object of the invention is to provide a vibrating conveyor drive in which a motor drives a belting engaging a cylindrical rotor on a drive shaft mounted floatingly.

Another object of the invention is to provide a vibrating conveyor drive wherein a top frame supported by fiberglass struts on a bottom frame carries a pair of depending plates journaling a drive shaft positioned between the two frames.

Figure 3:
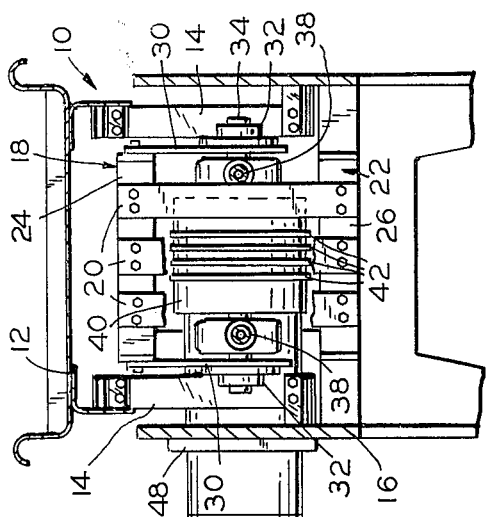
FIG. 3 is a vertical sectional view taken along line 3—3 of FIG. 2.
Figure 2:
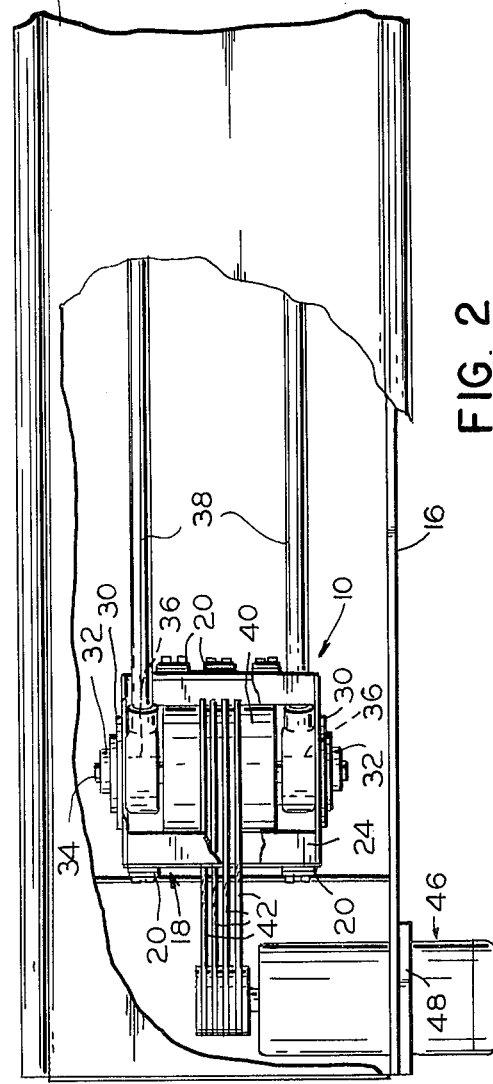
FIG. 2 is a fragmentary, side elevation view of the conveyor of FIG. 1.
Figure 1:
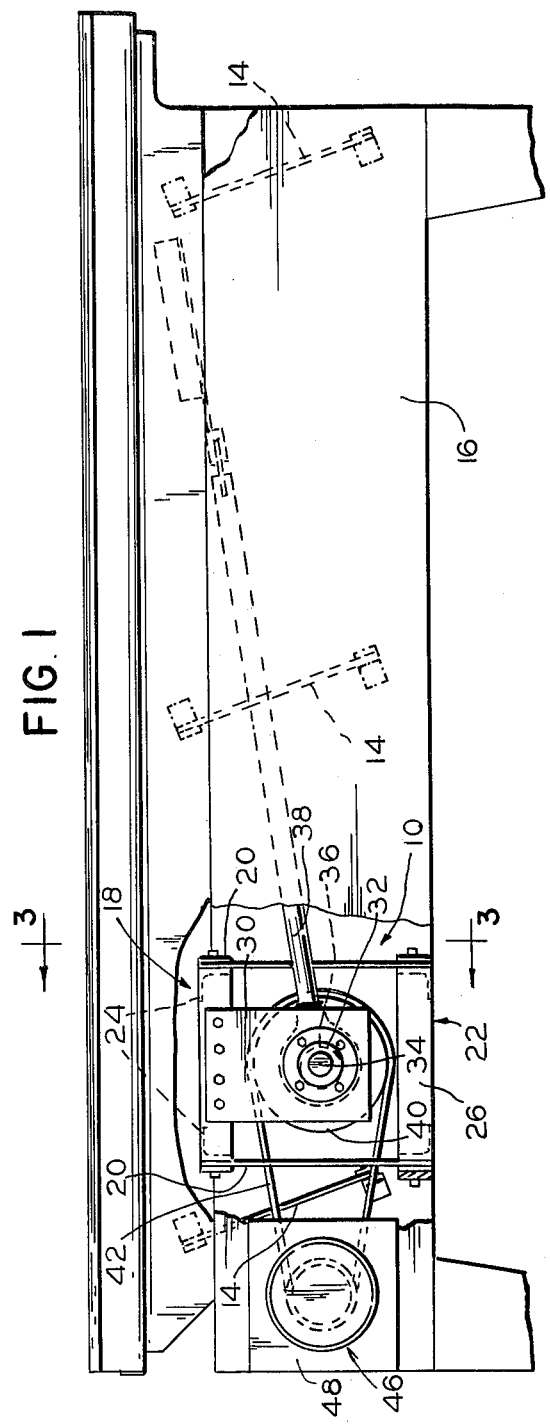
FIG. 1 is a fragmentary, top plan view of a vibrating conveyor having a drive forming one embodiment of the invention.

Referring now in detail to the drawings, there is shown therein a vibrating conveyor including a vibrating conveyor drive 10 forming a specific embodiment thereof and driving a conveyor table or trough 12 supported by sloping resilient struts 14 of fiberglass secured to a conveyor base 16. The drive includes a rigid, rectangular, open top frame 18 supported by vertical fiberglass struts 20 fastened rigidly at their upper ends to the top frame and fastened rigidly at their lower ends to a rigid, rectangular, open bottom frame or drive base 22 fixed rigidly to the conveyor base 16. The frames 18 and 22 are formed of angle members 24 and 26, respectively, welded together, and the end portions of the struts 20 are clamped to the vertical flanges of the angle members.

A pair of hanger plates 30 are bolted rigidly to the vertical flanges of the side ones of the angle members 24, and aligned outboard bearings 32 are bolted to the outside faces of the lower end portions of the hanger plates 30. A crankshaft 34 is journaled in the bearings 32, and has a pair of aligned eccentric or crank portions 36 just inside the hanger plates. The eccentric portions drive connecting rods 38 pivotally connected to the conveyor table 12 to reciprocate the conveyor table. A heavy rotor or cylindrical weight 40 is keyed to the crankshaft between the eccentric portions and is concentric with the bearings 32. The crankshaft is driven by belts 42 frictionally engaging the cylindrical periphery of the weight 40 and driven by pulleys 44 of an electric motor 46 mounted on a bracket 48 on the conveyor base 16. The motor is of the well known type which has an internal brake which is applied whenever the motor is turned off to rapidly bring the motor to a stop. This rapid stopping of the motor rapidly brings the conveyor to a stop from its operating frequency through its resonant frequency to minimize vibration from the resonant frequency.

OPERATION

When the motor 46 is energized it rapidly brings the conveyor through the resonant frequency up to full speed, and does so by rotating the crankshaft 34 through the belts 42 and the heavy cylindrical weight 40. The crankshaft reciprocates the conveyor table 12 through the connecting rods 38. The mass of the weight and the stiffness of the struts 20 are such relative to the stiffness of the struts 14, the table 12, and rated load of the conveyor that the throw of the table is substantially greater than the throw of the top frame 18. To stop the conveyor, the motor 46 is deenergized, which applies the brake to rapidly bring the conveyor to a stop.

What is claimed is:

1. In a vibrator drive,
   a balanced rotor including a cylindrical weight, shaft means mounting the weight concentrically thereon and coupled to the weight for rotating the weight, and crank means on the shaft means and eccentric to the shaft means,
   a pair of aligned bearing means journaling both ends of the shaft means,
   base means,
   means for rotating the shaft means,
   resilient means mounting the bearing means on the base means and preventing pivotal movement of the shaft means,
   single conveyor bed means,
   means independent of the resilient means serving to mount the conveyor bed means for back and forth movement,
   and connecting rod means connecting the crank means to the conveyor bed means,
   the single conveyor bed means being the only load of the crank means and the weight so that only inertia of the concentrically mounted weight and the action of the resilient means enables the crank means to drive the conveyor bed means.

2. In a vibratory drive,
   a crankshaft,
   a cylindrical weight mounted concentrically on the crankshaft and keyed thereto and forming a balanced rotor therewith,
   connecting rod means coupled eccentrically to the crankshaft and driven thereby,
   a pair of bearings concentric with the crankshaft and mounting the crankshaft for rotation,
   frame means supporting the bearings and preventing pivoting of the crankshaft,
   base means,
   means mounting the frame means resiliently on the base means,
   single conveyor bed means mounted on the base means independently of the frame means for back and forth movement relative to the base means and coupled to the connecting rod means,
   the connecting rod means and the single conveyor bed means being the only elements driven by the crankshaft.

3. The vibratory drive of claim 2 including belt means frictionally engaging the cylindrical weight,
   and means for driving the belt means to rotate the cylindrical weight.

4. In a vibratory conveyor,
   a base,
   a mounting frame, a plurality of parallel plate springs mounting the frame on the base in a position spaced upwardly from the base, a pair of hanger plates secured to opposite sides of the frame in positions depending downwardly from the frame, a pair of bearings carried by the hanger plates in aligned positions below the frame, a crankshaft journaled by the bearings, a cylindrical weight keyed to the crankshaft concentric to the bearings, connecting rod means driven by the crankshaft, drive means for rotating the crankshaft, conveyor bed means coupled to the connecting rod means, and resilient means mounting the bed means on the base independently of the frame and just above the frame.

5. The vibratory conveyor of claim 4 wherein the drive means includes an electric motor drive fixed relative to the base, and a belt driven by the motor drive and frictionally engaging the cylindrical counterweight.

6. The vibratory conveyor 4 wherein the bearings are outboard of the hanger plates.

* * * * *

UNITED STATES PATENT OFFICE
CERTIFICATE OF CORRECTION

PATENT NO. : 3,901,380
DATED : August 26, 1975
INVENTOR(S) : George F. Zier, Candido Casciato & Franklin G. Smith It is certified that error appears in the above-identified patent and that said Letters Patent are hereby corrected as shown below:

Column 1, line 14, delete "a" between "drives and "belting";

Column 4, line 10, between "conveyor" and "4" insert --of claim--

Signed and Sealed this twenty-fifth Day of November 1975

[SEAL]

Attest:

RUTH C. MASON
Attesting Officer

C. MARSHALL DANN
Commissioner of Patents and Trademarks